US010235993B1

(12) United States Patent
Bradley et al.

(10) Patent No.: US 10,235,993 B1
(45) Date of Patent: Mar. 19, 2019

(54) CLASSIFYING SIGNALS USING CORRELATIONS OF SEGMENTS

(71) Applicant: Friday Harbor LLC, New York, NY (US)

(72) Inventors: David Carlson Bradley, San Diego, CA (US); Sean Michael O'Connor, San Diego, CA (US); Yao Huang Morin, San Diego, CA (US); Ellisha Natalie Marongelli, Menlo Park, CA (US)

(73) Assignee: Friday Harbor LLC, New York, NY (US)

( * ) Notice: Subject to any disclaimer, the term of this patent is extended or adjusted under 35 U.S.C. 154(b) by 133 days.

(21) Appl. No.: 15/181,868

(22) Filed: Jun. 14, 2016

(51) Int. Cl.
```
G10L 15/08      (2006.01)
G10L 17/08      (2013.01)
G10L 15/10      (2006.01)
G10L 15/04      (2013.01)
G10L 15/02      (2006.01)
G10L 25/06      (2013.01)
G10L 25/51      (2013.01)
```
(52) U.S. Cl.
CPC .............. *G10L 15/10* (2013.01); *G10L 15/02* (2013.01); *G10L 15/04* (2013.01); *G10L 15/08* (2013.01); *G10L 17/08* (2013.01); *G10L 25/06* (2013.01); *G10L 25/51* (2013.01)

(58) Field of Classification Search
CPC ......... G10L 17/06; G10L 17/08; G10L 15/02; G10L 15/08
See application file for complete search history.

(56) References Cited

U.S. PATENT DOCUMENTS

| | | | | | |
|---|---|---|---|---|---|
| 4,336,421 | A | * | 6/1982 | Welch ..................... | G10L 15/05 704/243 |
| 4,348,553 | A | * | 9/1982 | Baker .................. | G06K 9/6206 704/237 |
| 4,454,586 | A | * | 6/1984 | Pirz .......................... | G10L 15/12 704/245 |
| 4,488,243 | A | * | 12/1984 | Brown ..................... | G10L 15/12 704/241 |
| 4,618,983 | A | * | 10/1986 | Nishioka .................. | G10L 15/12 704/239 |
| 4,712,242 | A | * | 12/1987 | Rajasekaran ........... | G10L 25/00 704/241 |
| 4,792,976 | A | * | 12/1988 | Watari .................... | G10L 15/00 704/238 |
| 4,811,210 | A | * | 3/1989 | McAulay .................. | G06E 1/02 385/17 |
| 4,918,732 | A | * | 4/1990 | Gerson .................... | G10L 15/00 704/233 |

(Continued)

*Primary Examiner* — Eric Yen

(74) *Attorney, Agent, or Firm* — Sheppard Mullin Richter & Hampton LLP

(57) ABSTRACT

An input signal may be classified by computing correlations between feature vectors of the input signal and feature vectors of reference signals, wherein the reference signals correspond to a class. The feature vectors of the input signal and/or the reference signals may be segmented to identify portions of the signals before performing the correlations. Multiple correlations of the segments may be combined to produce a segment score corresponding to a segment. The signal may then be classified using multiple segment scores, for example by comparing a combination of the segment scores to a threshold.

23 Claims, 7 Drawing Sheets

(56) References Cited

U.S. PATENT DOCUMENTS

| | | | | |
|---|---|---|---|---|
| 5,058,166 A * | 10/1991 | Ney | ............ | G10L 15/00 704/254 |
| 5,481,644 A * | 1/1996 | Inazumi | ............ | G10L 15/16 704/232 |
| 5,555,344 A * | 9/1996 | Zunkler | ............ | G10L 15/12 704/231 |
| 5,611,019 A * | 3/1997 | Nakatoh | ............ | G10L 15/063 704/233 |
| 6,009,391 A * | 12/1999 | Asghar | ............ | G10L 15/02 704/222 |
| 6,092,040 A * | 7/2000 | Voran | ............ | G10L 25/48 455/67.13 |
| 6,233,555 B1 * | 5/2001 | Parthasarathy | ............ | G10L 17/04 704/240 |
| 6,236,964 B1 * | 5/2001 | Tamura | ............ | G10L 15/10 704/254 |
| 6,697,779 B1 * | 2/2004 | Bellegarda | ............ | G10L 17/04 704/246 |
| 9,443,511 B2 * | 9/2016 | Hwang | ............ | G10L 15/10 |
| 2002/0135618 A1 * | 9/2002 | Maes | ............ | G06F 3/0481 715/767 |
| 2003/0078777 A1 * | 4/2003 | Shiau | ............ | G10L 15/30 704/251 |
| 2008/0172230 A1 * | 7/2008 | Hayakawa | ............ | G10L 17/14 704/249 |
| 2008/0243506 A1 * | 10/2008 | Sakai | ............ | G10L 15/32 704/256.4 |
| 2009/0222259 A1 * | 9/2009 | Kida | ............ | G10L 15/02 704/207 |
| 2009/0265170 A1 * | 10/2009 | Irie | ............ | G10L 17/26 704/236 |
| 2010/0174533 A1 * | 7/2010 | Pakhomov | ............ | G10L 17/26 704/205 |
| 2012/0224706 A1 * | 9/2012 | Hwang | ............ | G10L 15/10 381/56 |
| 2014/0142929 A1 * | 5/2014 | Seide | ............ | G06N 3/08 704/202 |

* cited by examiner

US 10,235,993 B1

CLASSIFYING SIGNALS USING CORRELATIONS OF SEGMENTS

BACKGROUND

Signal classification arises in a variety of applications. In signal classification, an input signal is received, and it is desired to determine to which of multiple classes the signal most likely belongs. For example, a simple classification task may be to automatically determine whether a received email is spam or is not spam. When an email is received, information about the email (e.g. the text of the email, the sender, an internet protocol address of the sender) may be processed using algorithms and models to classify the email as spam or as not spam.

Another example of signal classification relates to determining the identity of a speaker. A class may exist for each speaker of a set of speakers, and a model for each class may be created by processing speech samples of each speaker. To perform classification, a received speech signal may be compared to models for each class. The received signal may be assigned to a class based on a best match between the received signal and the class models.

In some instances, it may be desired to verify the identity of a speaker. A speaker may assert his identity (e.g., by providing a user name) and a speech sample. A model for the asserted identity may be obtained, and the received speech signal may be compared to the model. The classification task may be to determine whether the speech sample corresponds to the asserted identity.

In some instances, it may be desired to determine the identity of an unknown speaker using a speech sample of the unknown speaker. The speaker may be unknown, but it may be likely that the speaker is of a known set of speakers (e.g., the members of a household). The speech sample may be compared to models for each class (e.g., a model for each person in the household), and the classification task may be to determine which class best matches the speech sample or that no class matches the speech sample.

When performing signal classification, it is desired that the signal classification techniques have a low error rate, and the signal classification techniques described herein may have lower error rates than existing techniques.

BRIEF DESCRIPTION OF THE FIGURES

The invention and the following detailed description of certain embodiments thereof may be understood by reference to the following figures.

DETAILED DESCRIPTION

Described herein are techniques for performing classification of signals. Although the classification techniques described herein may be used for a wide variety of classification tasks, for clarity of presentation, an example classification task of text-dependent speaker recognition will be used. With text-dependent speaker recognition, a user may assert his identity (e.g., by providing a name, username, or identification number) and speak a previously determined prompt. By processing the speech of the user, it may be determined whether the user is who he claims to be. The classification techniques described herein, however, are not limited to speaker recognition, not limited to classifying audio signals, and may be applied to any appropriate classification task.

Example Classification System

A signal to be classified may be broken up into portions or segments. A segment may represent a coherent portion of the signal that is separated in some manner from other segments. For example, with speech, a segment may correspond to a portion of a signal where speech is present or where speech is phonated or voiced. FIG. 2D illustrates a spectrogram of a speech signal where the phonated portions are visible and the speech signal has been broken up into segments corresponding to the phonated portions of the signal.

To classify a signal, each segment of the signal may be processed and the output of the processing of a segment may provide an indication, such as a likelihood or a score, that the segment corresponds to a class (e.g., corresponds to speech of a particular user). The scores for the segments may be combined to obtain an overall score for the input signal and to ultimately classify the input signal.

When processing a segment, a correlation may be used to generate a score for a segment. For example, for text-dependent speaker recognition, a user may claim to be a particular person (claimed identity) and speak a prompt. Using the claimed identity, previously created reference segments corresponding to the claimed identity may be retrieved from a data store (the person corresponding to the claimed identity may have previously enrolled or provided audio samples of the prompt). Input segments may be created from an audio signal of the user speaking the prompt. The input segments may be correlated with the reference segments to generate a score indicating a match between the user and the claimed identity.

Figure 1A:
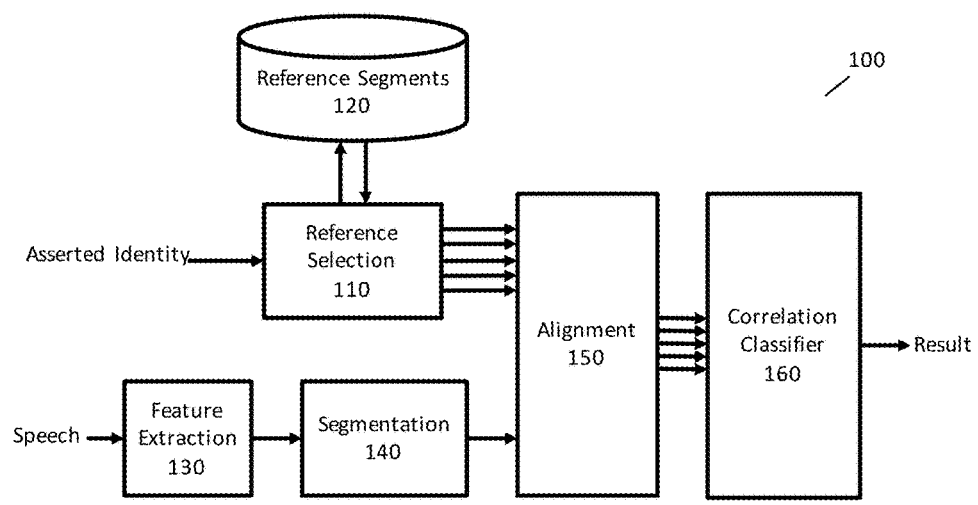
FIG. 1A illustrates a system for performing classification using correlations of segments and FIG. 1B illustrates an example system for generating reference sequences of segments to be used with the system of FIG. 1A.

FIG. 1A shows an example of a system 100 that may be used for text-dependent speaker recognition. A user provides an asserted identity and speaks a prompt. For example, the user may be authenticating himself on a smart phone, authenticating himself on a personal computer, or seeking access to a locked room. The classification may be performed on a single device (e.g., a smart phone or personal computer) or may be performed remotely by transmitting the asserted identity and an audio signal of the speech to a remote device, such as a server computer.

A received audio signal may be processed by a feature extraction component 130. For example, feature extraction component 130 may process the audio signal to generate feature vectors at regular time intervals, such as every 10 milliseconds. A feature vector may comprise harmonic amplitudes, mel-frequency cepstral coefficients, or any other suitable features.

As an example, a feature vector of harmonic amplitudes may include an estimate of an amplitude of each harmonic in a portion of a signal. For a portion of the audio signal, harmonic amplitudes may be computed as follows: (i) estimate a pitch of the portion of the signal (optionally using a fractional chirp rate); (ii) estimate an amplitude of each harmonic of the portion of the signal where the first harmonic is at the pitch, the second harmonic is at twice the pitch, and so forth; and (iii) construct a vector of the estimated amplitudes. This process may be repeated at regular time intervals, such as every 10 milliseconds. For example, at a first time, a first pitch may be estimated and then amplitudes of the harmonics may be estimated from the signal using the pitch. A first feature vector for the first time may be constructed as $[A_{1,1}\ A_{1,2}\ \ldots\ A_{1,M}]$ where $A_{1,j}$ indicates the amplitude of the $j^{th}$ harmonic at the first time for j from 1 to M. Similarly, a second feature vector for the second time may be constructed as $[A_{2,1}\ A_{2,2}\ \ldots\ A_{2,M}]$, and so forth. Collectively, the feature vectors may be referred to as a sequence of feature vectors. Additional details regarding the computation of harmonic amplitude features are described in U.S. application Ser. No. 14/969,029, filed on Dec. 15, 2015, and titled "Determining Features of Harmonic Signals," the entire contents of which are hereby incorporated by reference for all purposes.

Feature extraction component 130 may output a sequence of feature vectors that may then be processed by segmentation component 140. Segmentation component 140 may create an input sequence of segments from the sequence of feature vectors. A segment of the input sequence may comprise a portion or subset of the sequence of feature vectors. For example, a sequence of feature vectors produced by feature extraction component 130 may comprise 100 feature vectors, and segmentation component 140 may identify a first segment the corresponds to feature vectors 11 to 42, a second segment that corresponds to feature vectors 43 to 59, and a third segment that corresponds to feature vectors 75 to 97. Collectively, the segments identified by segmentation component 140 may be referred to a sequence of segments, and each segment corresponds to a portion or subset of the sequence of feature vectors. Segmentation component 140 may use any appropriate techniques, such as any of the techniques described below.

Reference selection component 110 may receive an asserted identity of the user and may retrieve a plurality of reference sequences of segments from reference segments data store 120. For example, reference segments data store 120 may include reference sequences of segments that were created when users enroll with the speaker recognition system.

Alignment component 150 may receive the input sequence of segments from segmentation component 140 and the plurality of reference sequences of segments from reference selection component 110 and perform an alignment operation. In some implementations, the input sequence of segments and each of the plurality of reference sequences of segments may comprise the same number of segments. For example, each sequence may comprise 5 segments. Alignment component 150 may align the Nth segment of the input sequence with the Nth segment of each of the plurality of reference sequences. Accordingly, if there are M references sequences and each sequence has N segments, then alignment component may perform N times M alignment operations. Alignment component may use any suitable techniques for aligning the segments, such as dynamic time warping or any of the alignment techniques described below.

Correlation classifier component 160 may receive the aligned input sequence and reference sequences and make a classification decision by performing correlation operations on the segments as described in greater detail below. Correlation classifier component 160 may also use other segments in making a classification decision. For example, correlation classifier component 160 may receive and use reference sequences of segments corresponding to other users. Correlation classifier component 160 may output a result, such as whether the user's speech matches the asserted identity.

Figure 1B:
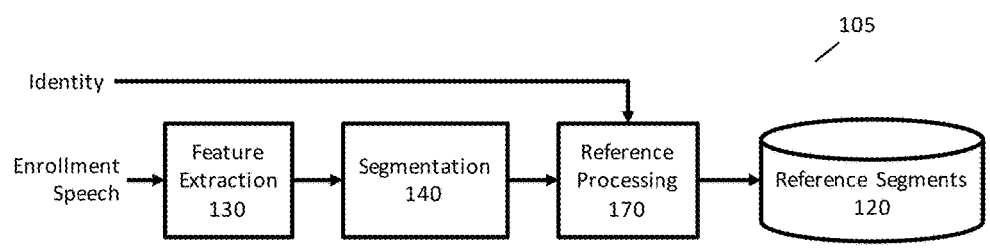

FIG. 1B shows an example of a system 105 that may be used for generating reference sequences of segments that may be used with system 100 of FIG. 1A. In FIG. 1B, a user provides an identity and enrollment speech. In some implementations, other procedures may be taken to ensure that the identity is correct, such as requiring the user to provide identification. The enrollment speech may comprise multiple instances of the user speaking a prompt. The enrollment speech may be processed with feature extraction component 130 and segmentation component 140 (which may perform the same or similar processing as the corresponding components of FIG. 1A). Reference processing component 170 may receive a reference sequence of segments for each example of the user speaking the prompt. Reference processing component 170 may store the reference sequences of segments in reference segments data store 120 in association with the identity of the user so that they may later be retrieved by reference selection component 110.

Segmentation

Further details of exemplary techniques for segmentation are now provided. In some implementations, segmentation techniques may be based on functions that are computed from one or more of portions of a signal, spectra (or magnitude of spectra) of portions of the signal, or features computed from portions of the signal. Herein, these functions may be referred to as stripe functions. Stripe functions of a signal may be computed on regular intervals, such as every 10 milliseconds.

Some stripe functions may be computed from a spectrum (e.g., a fast Fourier transform or FFT) of a portion of the signal. For example, a portion of a signal may be represented as $x_n$ for n from 1 to N, and the spectrum at the frequency $f_i$ may be represented as $X_i$ for i from 1 to N.

Stripe function moment1spec is the first moment, or expected value, of the FFT, weighted by the values:

$$moment1spec = \mu = \frac{\sum_{i=1}^{N} X_i f_i}{\sum_{i=1}^{N} X_i}$$

Stripe function moment2spec is the second central moment, or variance, of the FFT frequencies, weighted by the values:

$$moment2spec = \sigma^2 = \frac{\sum_{i=1}^{N} X_i (f_i - \mu)^2}{\sum_{i=1}^{N} X_i}$$

Stripe function totalEnergy is the energy density per frequency increment:

$$totalEnergy = \frac{1}{N}\sum_{i=1}^{N} X_i^2$$

Stripe function periodicEnergySpec is a periodic energy measure of the spectrum up to a certain frequency threshold (such as 1 kHz). It may be calculated by (i) determining the spectrum up to the frequency threshold (denoted $X_C$), (ii) taking the magnitude squared of the Fourier transform of the spectrum up to the frequency threshold (denoted as X'), and (iii) computing the sum of the magnitude squared of the inverse Fourier transform of X':

$$X' = |F\{X_C\}|^2$$

$$periodicEnergySpec = \Sigma |F^{-1}\{X'\}|^2$$

Stripe function Lf ("low frequency") is the mean of the spectrum up to a frequency threshold (such as 2 kHz):

$$Lf = \frac{1}{N'}\sum_{i=1}^{N'} X_i$$

where N' is a number less than N.

Stripe function Hf ("high frequency") is the mean of the spectrum above a frequency threshold (such as 2 kHz):

$$Hf = \frac{1}{N - N' + 1}\sum_{i=N'}^{N} X_i$$

Some stripe functions may be computed from a stationary spectrum of a portion of the signal. For a portion of a signal, let $X'_i$ represent the value of the stationary spectrum and $f_i$ represent the frequency corresponding to the value for i from 1 to N. Additional details regarding the computation of a stationary spectrum are described in U.S. application Ser. No. 14/969,029, filed on Dec. 15, 2015, and titled "Determining Features of Harmonic Signals," the entire contents of which are hereby incorporated by reference for all purposes.

Stripe function stationaryMean is the first moment, or expected value, of the stationary spectrum, weighted by the values:

$$stationaryMean = \mu_S = \frac{\sum_{i=1}^{N} X'_i f_i}{\sum_{i=1}^{N} X'_i}$$

Stripe function stationaryVariance is the second central moment, or variance, of the stationary spectrum, weighted by the values:

$$stationaryVariance = \sigma_S^2 = \frac{\sum_{i=1}^{N} X'_i (f_i - \mu_S)^2}{\sum_{i=1}^{N} X'_i}$$

Stripe function stationarySkewness is the third standardized central moment, or skewness, of the stationary spectrum, weighted by the values:

$$stationarySkewness = \gamma_S = \frac{\sum_{i=1}^{N} X'_i (f_i - \mu_S)^3}{\sigma_S^3 \sum_{i=1}^{N} X'_i}$$

Stripe function stationaryKurtosis is the fourth standardized central moment, or kurtosis, of the stationary spectrum, weighted by the values:

$$stationaryKurtosis = \kappa_S = \frac{\sum_{i=1}^{N} X'_i (f_i - \mu_S)^4}{\sigma_S^4 \sum_{i=1}^{N} X'_i}$$

Stripe function stationaryBimod is the Sarle's bimodality coefficient of the stationary spectrum:

$$stationaryBimod = \beta_S = \frac{\gamma_S^2 + 1}{\kappa_S}$$

Stripe function stationaryPeriodicEnergySpec is similar to periodicEnergySpec except that it is computed from the stationary spectrum. It may be calculated by (i) determining the stationary spectrum up to the frequency threshold (denoted $X'_C$), (ii) taking the magnitude squared of the Fourier transform of the stationary spectrum up to the frequency threshold (denoted as X''), and (iii) computing the sum of the magnitude squared of the inverse Fourier transform of X'':

$$X'' = |F\{X'_C\}|^2$$

$$stationaryPeriodicEnergySpec = \Sigma |F^{-1}\{X''\}|^2$$

Some stripe functions may be computed from a log likelihood ratio (LLR) spectrum of a portion of the signal. For a portion of a signal, let $X''_i$ represent the value of the LLR spectrum and $f_i$ represent the frequency corresponding to the value for i from 1 to N. Additional details regarding the computation of an LLR spectrum are described in U.S. application Ser. No. 14/969,029, filed on Dec. 15, 2015, and titled "Determining Features of Harmonic Signals," the entire contents of which are hereby incorporated by reference for all purposes.

Stripe function evidence is the sum of the values all the LLR peaks where the values are above a threshold (such as 100).

Stripe function KLD is the mean of the LLR spectrum:

$$KLD = \frac{1}{N}\sum_{i=1}^{N} X''_i$$

Stripe function MLP (max LLR peaks) is the maximum LLR value:

$$MLP = m_i^a \times X''_i$$

Some stripe functions may be computed from harmonic amplitude features computed from a portion of the signal.

Let N be the number of harmonic amplitudes, and $m_i$ be the magnitude of the $i^{th}$ harmonic, and $a_i$ be the complex amplitude of the $i^{th}$ harmonic for i from 1 to N.

Stripe function mean is the sum of harmonic magnitudes, weighted by the harmonic number:

$$\text{mean} = \sum_{i=1}^{N} i m_i$$

Stripe function hamMean is the first moment, or expected value, of the harmonic amplitudes, weighted by their values, where $f_i$ is the frequency of the harmonic:

$$hamMean = \mu_H = \frac{\sum_{i=1}^{N} m_i f_i}{\sum_{i=1}^{N} m_i}$$

Stripe function hamVariance is the second central moment, or variance, of the harmonic amplitudes, weighted by their values:

$$hamVariance = \sigma_H^2 = \frac{\sum_{i=1}^{N} m_i (f_i - \mu_H)^2}{\sum_{i=1}^{N} m_i}$$

Stripe function hamSkewness is the third standardized central moment, or skewness, of the harmonic amplitudes, weighted by their values:

$$hamSkewness = \gamma_H = \frac{\sum_{i=1}^{N} m_i (f_i - \mu_H)^4}{\sigma_H^3 \sum_{i=1}^{N} m_i}$$

Stripe function hamKurtosis is the fourth standardized central moment, or kurtosis, of the harmonic amplitudes, weighted by their values:

$$hamKurtosis = \kappa_H = \frac{\sum_{i=1}^{N} m_i (f_i - \mu_H)^4}{\sigma_H^4 \sum_{i=1}^{N} m_i}$$

Stripe function hamBimod is the Sarle's bimodality coefficient of the harmonic amplitudes weighted by their values:

$$hamBimod = \beta_H = \frac{\gamma_H^2 + 1}{\kappa_H}$$

Stripe function H1 is the absolute value of the first harmonic amplitude:

$$H1 = |a_1|$$

Stripe function H1to2 is the norm of the first two harmonic amplitudes:

$$H1to2 = \sqrt{|a_1|^2 + |a_2|^2}$$

Stripe function H1to5 is the norm of the first five harmonic amplitudes:

$$H1to5 = \sqrt{|a_1|^2 + |a_2|^2 + |a_3|^2 + |a_4|^2 + |a_5|^2}$$

Stripe function H3to5 is the norm of the third, fourth, and fifth harmonic amplitudes:

$$H3to5 = \sqrt{|a_3|^2 + |a_4|^2 + |a_5|^2}$$

Stripe function meanAmp is the mean harmonic magnitude:

$$meanAmp = \frac{1}{N} \sum_{i=1}^{N} m_i$$

Stripe function harmonicEnergy is calculated as the energy density:

$$harmonicEnergy = \frac{1}{N} \sum_{i=1}^{N} m_i^2$$

Stripe function energyRatio is a function of harmonic energy and total energy, calculated as the ratio of their difference to their sum:

$$energyRatio = \frac{harmonicEnergy - totalEnergy}{harmonicEnergy + totalEnergy}$$

The above stripe functions may be used individually or in combination to segment a signal. Some illustrative examples will now be presented.

In some implementations, segmentation may be performed by identifying notches in the signal (e.g., portions with low energy or low indication of phonated speech), determining an initial set of segments as the portions of the signal between notches, rejecting any of the initial segments that are determined to not contain phonated speech, and then determining the boundaries of the segments.

In some implementations, notches may be identified using the following combination of stripe functions:

$$c = -(KLD + MLP + harmonicEnergy)$$

For example, the function c may be computed at 10 millisecond intervals of the signal using the stripe functions as described above. In some implementations, the individual stripe functions (KLD, MLP, and harmonicEnergy) may be z-scored before being combined to compute the function c. The function c may then be smoothed by using any appropriate smoothing technique, such as Lowess smoothing. Each local peak of the function c may be determined to be a "notch" in the signal. The portion of the signal before the first notch, between any subsequent pairs of notches, and after the last notch may be identified as an initial set of segments.

Figure 2A:
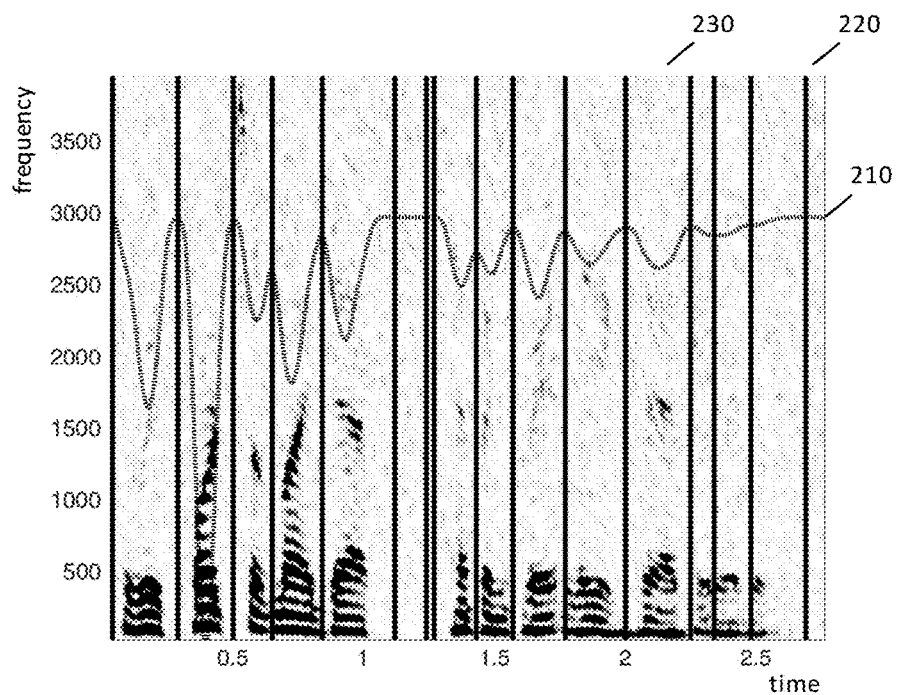
FIGS. 2A, 2B, and 2C illustrate example stripe functions for segmenting a signal.

FIG. 2A shows a spectrogram of a signal with the function c 210 superimposed on top of the spectrogram with a dashed line. Each local peak of the function c corresponds to a notch and the notches are shown by the vertical lines, such as vertical line 220. The initial segments may correspond to the portions of the signal between the vertical lines, such as segment 230.

In some implementations, the initial segments may be verified using another function and some of the initial segments may be rejected as not containing phonated speech. In some implementations, the following combination of stripe functions may be used:

$$p = H1to2 + Lf + \text{stationaryPeriodicEnergySpec} + \text{energyRatio}$$

For example, the function p may be computed at 10 millisecond intervals of the signal using the stripe functions as described above. In some implementations, the individual stripe functions (H1to2, Lf, stationaryPeriodicEnergySpec, and energyRatio) may be z-scored before being combined to compute the function p. The function p may then be smoothed by using any appropriate smoothing technique, such as Lowess smoothing.

Segments may be retained or rejected by comparing the function p to a threshold. For example, where the function p is z-scored (or the input stripe functions are z-scored) the threshold may be set to −0.5 (the mean minus half the standard deviation). In some implementations, a segment may be retained if the function p exceeds the threshold at least once during the segment and the segment may be rejected if the function p is always below the threshold.

Figure 2B:
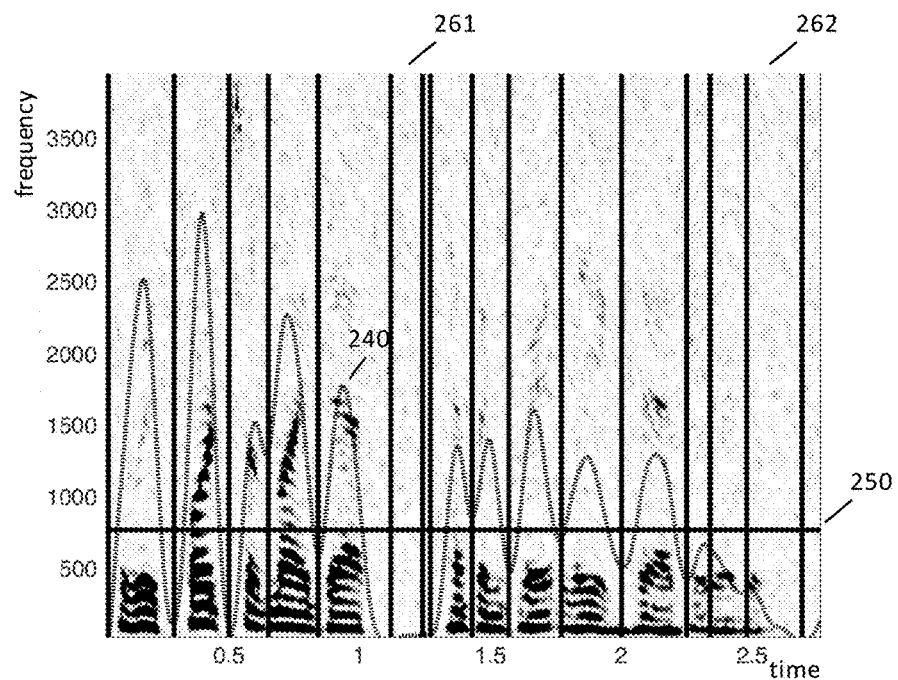

FIG. 2B shows the same spectrogram of FIG. 2A with the function p 240 superimposed on top of the spectrogram with a dashed line. The threshold for determining whether a segment contains phonated speech is shown with horizontal line 250. Some segments, such as segment 261 and segment 262 may be rejected because the function p is below the threshold for the entire duration of the segment.

In some implementations, one or both of the beginning boundary and/or the ending boundary of the segments may be determined to remove portions of non-phonated speech at the beginning and/or end of the segments. This processing is optional as it may not be necessary to remove the non-phonated portions from the segments.

In some implementations, the boundaries of the segments may be determined using the following function:

$$s = \frac{d^2}{dt^2}(KLD + MLP + harmonicEnergy)$$

For example, the functions may be computed at 10 millisecond intervals of the signal using the stripe functions as described above. In some implementations, the individual stripe functions (KLD, MLP, and harmonicEnergy) may be z-scored before being combined to compute the function s. The function s may then be smoothed by using any appropriate smoothing technique, such as Lowess smoothing.

In some implementations, peaks of the function s may correspond to segment boundaries. To determine the beginning boundary of a segment, the initial beginning boundary (e.g., as determined by the notch) may be moved inward (i.e., forward) so that the beginning boundary corresponds to another point, such as the next local peak in the function s or a zero crossing in the function s. To determine the ending boundary of a segment, the initial ending boundary (e.g., as determined by the notch) may be moved inward (i.e., backward) so that the ending boundary corresponds to the nearest local peak in the function s. In some situations, an initial boundary may not be moved. For example, if the value of the functions at the initial boundary is larger than the value of the function s at the next local peak, the initial boundary may be maintained.

Figure 2C:
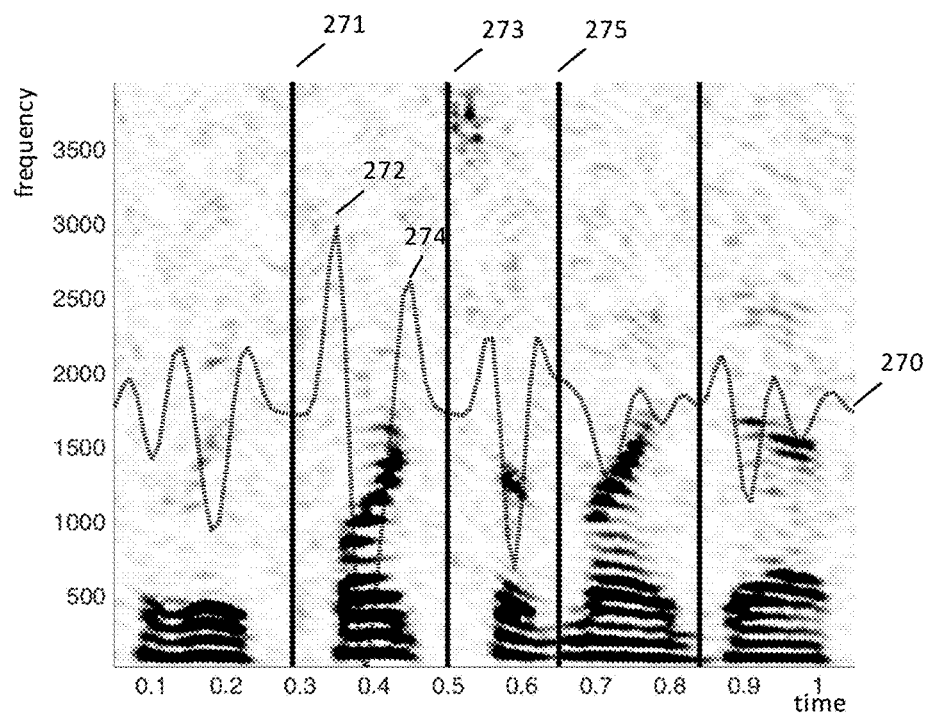
Figure 2D:
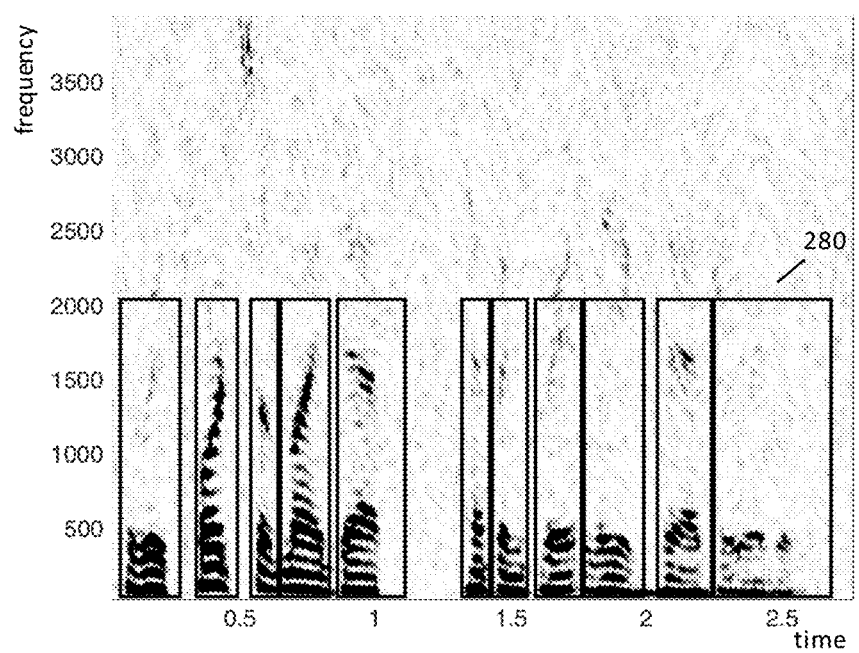
FIG. 2D illustrates an example segmentation of a signal.

FIG. 2C shows a zoomed in portion of the spectrograms of FIGS. 2A and 2B. In FIG. 2C, the functions 270 is superimposed on top of the spectrogram with a dashed line. The second segment in FIG. 2C has an initial beginning boundary 271 and an initial ending boundary 273 that may have been determined using notches as described above. The initial beginning boundary 271 may be moved inward to updated beginning boundary 272, which corresponds to the next local peak of the function s. The initial ending boundary 273 may be moved inward to updated ending boundary 274, which corresponds to the previous local peak of the functions. Note that initial boundary 275 of the fourth segment may not be modified because the next local peak of the function s has a lower value than at the initial boundary.

FIG. 2D shows the spectrograms of FIGS. 2A and 2B after the segments have been determined. Each box in FIG. 2D, such as box 280 shows the identified segments with the left edge of the box indicating the beginning of the segment and the right edge of the box indicating the end of a segment. Note that in the example of FIG. 2D only the beginning boundaries of segments were adjusted using the functions, and the ending boundaries remained as determined by the notches.

Another approach to segmentation will now be described. In some implementations, segments may be identified by finding portions of the signal with a high level of phonation. In some implementations, the following combination of stripe functions may be used:

$$h = \frac{d^2}{dt^2}(KLD + MLP + H1 \text{ to } 2 + harmonicEnergy)$$

For example, the function h may be computed at 10 millisecond intervals of the signal using the stripe functions as described above. In some implementations, the individual stripe functions (KLD, MLP, H1to2, and harmonicEnergy) may be z-scored before being combined to compute the function h. The function h may then be smoothed by using any appropriate smoothing technique, such as Lowess smoothing. The window size used for smoothing may correspond to the expected length of a segment.

In some implementations, a segment may be identified for each trough in the function h that is below zero. Where there are two troughs below zero within a specified distance of each other (e.g., 800 milliseconds), only the lower trough may be used to identify a segment. In some implementations, the segments identified from the troughs in the function h may be validated using other techniques such as the techniques described above.

The boundaries of the segments may also be determined using the function h. In some implementations, the beginning boundary of a segment may be determined as corresponding to the first peak of the function h that is above 0 and before the location of the segment determined by the trough. The ending boundary of a segment may be determined as corresponding to the first peak of the function h that is above 0 and after the location of the segment determined by the trough.

Segmentation techniques may use other combinations of stripe functions in addition to the example combinations described above. The locations of segments and segment boundaries may then be identified from peaks or troughs of the combinations or based on statistics computed from the combinations.

Canonical Segments

In some implementations, speaker recognition may be performed using a plurality of reference audio signals of a single user speaking the same prompt multiple times. For example, a user, when enrolling in the speaker recognition system may speak the same prompt more than once. Each reference audio signal may be segmented to obtain a sequence of segments. Collectively, the plurality of audio signals of the user may be processed to obtain a plurality of reference sequences of segments. If the segmentation is performed separately for each reference audio signal, the number of segments may be different for different reference audio signals because of variations in how the prompt was spoken even though the same prompt was spoken each time. In some implementations, it may be desired that each reference sequence of segments have the same number of segments.

Figure 3A:
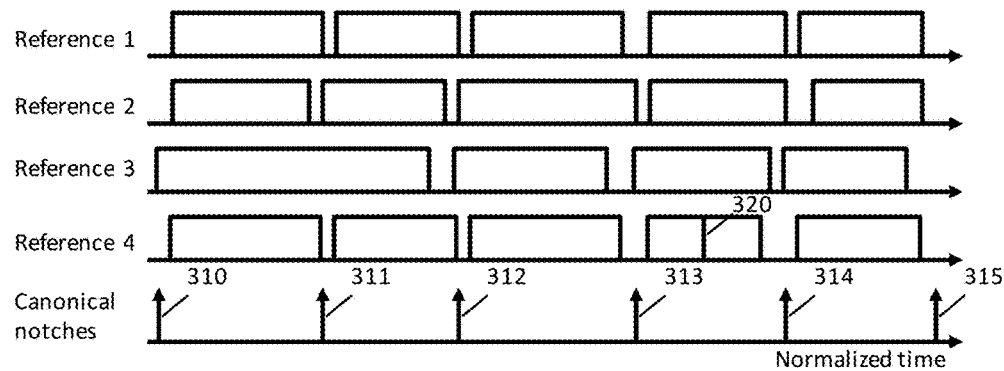
FIGS. 3A and 3B illustrate a canonical segmentation of a signal.

FIG. 3A illustrates a conceptual representation of segments for four reference signals. In FIG. 3A, the horizontal axis represents time or normalized time. In some implementations, each of the reference signals may be scaled to have the same length, such as scaling by using dynamic time warping on the signals or features. Each rectangle indicates the start and stop time for each segment. Since the same speaker is speaking the same prompt for all four reference signals, it may be expected to have similar segments for all four reference signals.

Comparing the four reference signals, the segments are similar but there are differences. Reference signal 1 and reference signal 2 each have 5 segments. Reference signal 3 has four segments and the first segment is approximately the combination of the first two segments of reference signals 1, 2, and 4. Reference signal 4 has six segments and the combined fourth and fifth segments of reference signal 4 correspond approximately to the fourth segment of reference signals 1, 2, and 3.

The segmentations of the reference signals may be modified so that they each have the same number of segments and have similar begin and end times for each segment. The modified segments may be referred to as canonical segments. Any appropriate technique may be used to generate the canonical segments. For example, clustering and voting algorithms may be used to determine where segment boundaries will exist in the reference sequences.

In the following, a technique for generating canonical segments using the notches described above will be described. First, notches may be identified for each reference signal as described above. For example, for the reference signals as described in FIG. 3A, a notch may exist at the beginning of each reference signal, between subsequent pairs of segments, and at the end of each reference signal. The locations of the notches in time may be normalized so that they are on the same time scale. For example, the noteches may be normalized using dynamic time warping or each reference sequence may be stretched to match the longest reference sequence and the locations in time of the notches may be scaled linearly.

Next common or matching notches across the reference signals are identified. In some implementations, a probability density function may be estimated for likely locations of the notches. For example, a cumulative distribution function may first be estimated using the locations of the notches in the reference signals and the probability density function may be estimated as a derivative of the cumulative density function. Additional details regarding estimating a cumulative distribution function and a probability density function are described in U.S. application Ser. No. 14/969,029, filed on Dec. 15, 2015, and titled "Determining Features of Harmonic Signals," the entire contents of which are hereby incorporated by reference for all purposes.

Canonical notches may be identified by comparing peaks of the estimated probability density function to a threshold. For example, canonical notches 310-315 are shown in FIG. 3A. After determining the canonical notches, the canonical notches may be imposed on each of the reference sequences. For each reference sequence, an existing notch may be determined to correspond to one of the canonical notches, an existing notch may be disregarded as not corresponding to any of the canonical notches, or a notch may be added because no existing notch corresponds to one of the canonical notches. For example, reference sequence 3 does not have a notch corresponding to canonical notch 311 and a notch may be inserted in that location of reference sequence 3. Reference sequence 4 has a notch 320 that does not correspond to any canonical notch and notch 320 may be discarded from reference sequence 4.

Any appropriate techniques may be used to impose the canonical notches onto the reference sequences. For example, a distance between notches of reference signals and canonical notches may be used. If the distance between a canonical notch and the closest notch of a reference signal is less than a threshold (e.g., 100 milliseconds) then it may be determined that the reference signal notch corresponds to the canonical notch. If no notches of the reference signal are within the threshold distance of a canonical notch, then a notch may be added to the reference signal at the location of the canonical notch. If no canonical notches are within the threshold distance of a notch of a reference signal, then that notch of the reference signal may be discarded. Any appropriate techniques may be used to determine the threshold. For example, the threshold may be a fixed parameter or may be determined from the estimated probability density function.

Figure 3B:
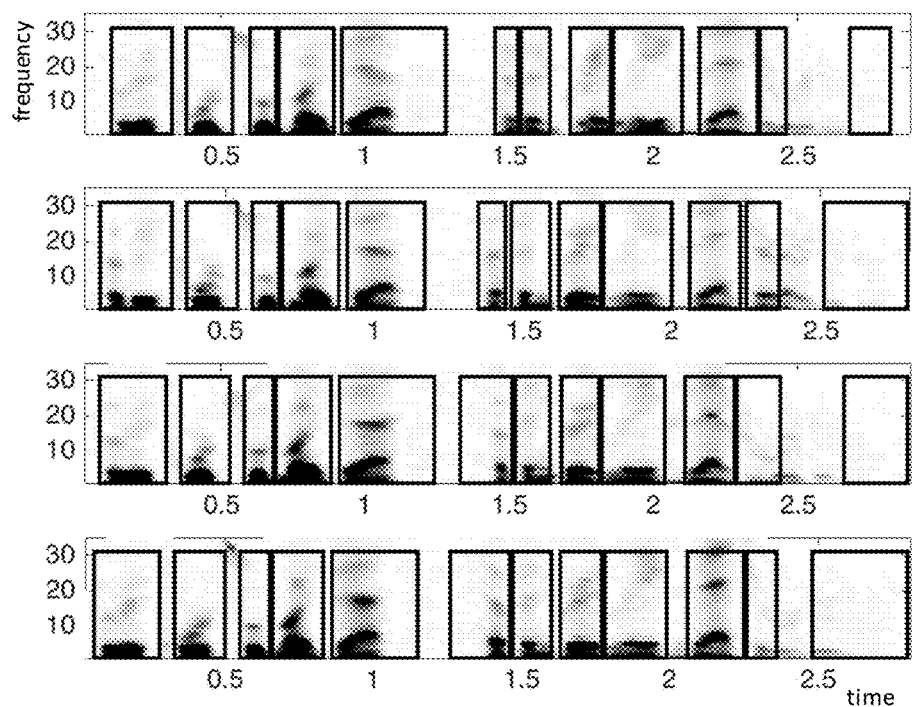

The set of canonical notches may determine the segments in the reference signals. After the canonical notches have been imposed on the reference signals, a reference sequence of segments may be determined for each reference signal using any of the techniques described above. For example, a segment may exist between each pair of subsequent canonical notches, but the actual segment boundaries may be tighter than the locations of the canonical notches. FIG. 3B shows an example of canonical segments determined for four reference signals. Each reference signal has the same number of segments, and same numbered segment represents similar speech across all of the reference signals.

Correlation Classifier

A signal may be classified using correlations of segments in the signal. For clarity in the presentation, the correlation classifier will be described using text-dependent speaker recognition, but the correlation classifier is not limited to speaker recognition, not limited to classifying audio signals, and may be applied to any appropriate classification task.

Figure 4:
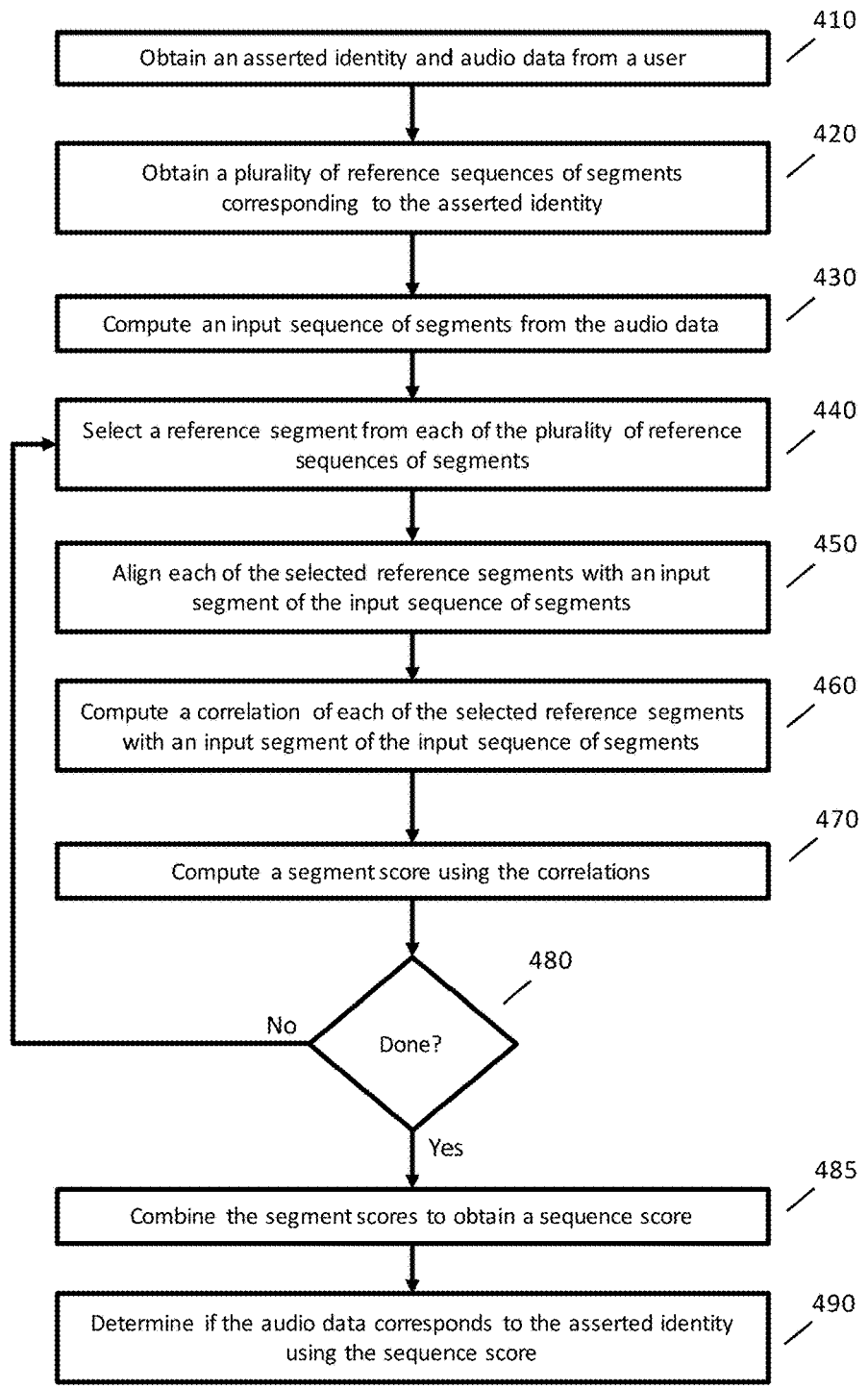
FIG. 4 is a flowchart of an example implementation of performing classification using correlations of segments.

FIG. 4 is a flowchart illustrating an example implementation of classifying a signal using correlations of segments. In FIG. 4, the ordering of the steps is exemplary and other orders are possible, not all steps are required and, in some implementations, some steps may be omitted or other steps may be added. The process of the flowcharts may be implemented, for example, by one or more computers, such as the computers described below or of the system 100 of FIG. 1A.

At step 410, an asserted identity and audio data is received from a user of the speaker verification system. The asserted identity may comprise any data that indicates the identity of a person, such as a user name or an identification number. The audio data may be any data that represents speech of the user, such as an audio signal or a sequence of feature vectors computed from an audio signal.

At step 420, a plurality of reference sequences of segments is obtained using the asserted identity. For example, the reference sequences of segments may be obtained by performing a database lookup using the asserted identity. The reference sequences of segments may have been generated, for example, when a user enrolled in a speaker recognition system. The reference sequence of segments may have been generated during the enrollment process or may be generated at a later time, such is immediately prior to performing a speaker recognition procedure. The reference sequences of segments may have been created using any suitable segmentation technique, including but not limited to any of the segmentation techniques described above.

Figure 6:
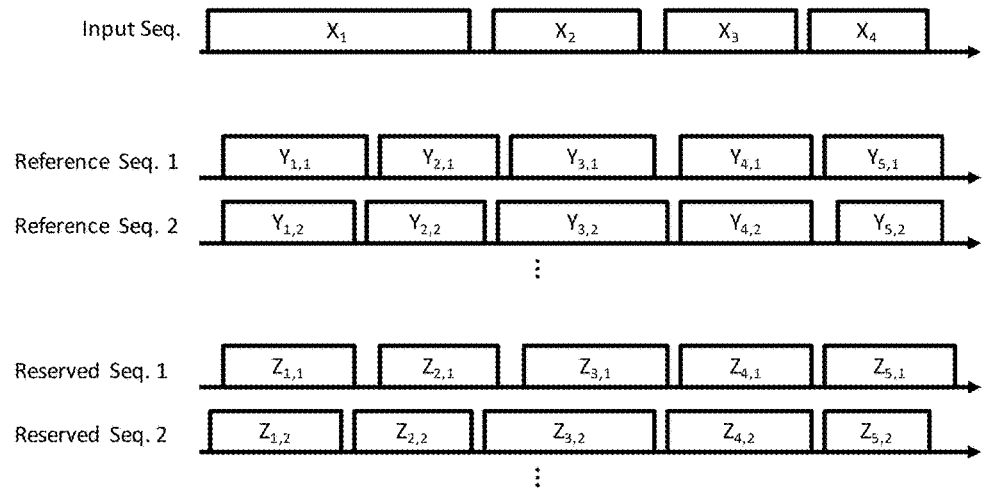
FIG. 6 illustrates an example of a plurality of reference sequences of segments.

FIG. 6 illustrates an example of a plurality of reference sequences of segments where $Y_{j,k}$ represents the $j^{th}$ reference segment of the $k^{th}$ reference sequence of segments. In the example of FIG. 6 each sequence has 5 segments, but the number of segments may vary and will depend on the words of the prompt being spoken. FIG. 6 shows two reference sequences of segments, but other numbers of reference sequences may be used, such as 10 reference sequences of segments.

In some implementations, a plurality of reference sequences of feature vectors may be obtained instead of or in addition to the plurality of reference sequences of segments. For example, each of the reference sequences of segments may have been computed from one of the reference sequences of feature vectors. In some implementations, the segments may be indicated by start and stop locations in a sequence of feature vectors.

At step 430, an input sequence of segments is created from the audio data. FIG. 6 illustrates an example of an input sequence of segments where $X_j$ represents the $j^{th}$ input segment of the input sequence of segments. The number of segments in the input sequence of segments may be the same as or different from the number of segments in each of the reference sequences of segments. The input sequence of segments may be created using any suitable segmentation technique, including but not limited to any of the segmentation techniques described above.

At steps 440 to 480, segments are processed. The segments may be processed in a variety of orders, and the techniques described herein are not limited to any particular ordering and in some implementations the segments may be processed in parallel.

In some implementations, it may be known or assumed that the reference sequences of segments have the same number of segments, and that the $i^{th}$ segment of each reference sequence corresponds to one another. For example, for text-dependent speaker recognition, the first segment of each reference sequence may correspond to the first syllable of the prompt, the second segment may correspond to the second syllable, and so forth.

In some implementations, the segments may be processed iteratively with the segments of the input sequence indicating the processing order. For example, the processing may proceed in the following order: a first input segment of the of input sequence is selected; reference segments of reference sequences are selected as corresponding to the first input segment; a second input segment of the input sequence is selected; reference segments of reference sequences are selected as corresponding to the second input segment; and so forth.

In some implementations, the segments may be processed iteratively with the segments of the reference sequences indicating the processing order where the reference sequences were processed with canonical segmentation. For example, the processing may proceed in the following order: a first reference segment of each reference sequence is selected; an input segment is selected as corresponding to the first reference segments; a second reference segment of each reference sequence is selected; an input segment is selected as corresponding to the second reference segments; and so forth.

In some implementations, the segments may be processed iteratively with one reference sequence indicating the processing order. For example, the processing may proceed in the following order: a first reference segment of a first reference sequence is selected; an input segment is selected as corresponding to the first reference segment; reference segments from other reference sequences are selected as corresponding to the first reference segment; a second reference segment of the first reference sequence is selected; an input segment is selected as corresponding to the second reference segment; reference segments from other reference sequences are selected as corresponding to the second reference segment; and so forth.

The following description of steps 440 to 480 is one example implementation. The techniques described herein are not limited to this particular implementation, and steps 440 to 480 may be implemented as described above.

At step 440, a reference segment is selected from each of the plurality of reference sequences of segments. For example, steps 440 to 480 may be part of a loop, and on the $i^{th}$ iteration of the loop, the $i^{th}$ reference segment of each reference sequence of segments may be selected.

At step 450, each of the selected reference segments are aligned with an input segment of the input sequence of segments. Aligning a reference segment with an input segment may comprise shifting one or both segments in time so that similar feature vectors of each segment are aligned with each other. In some implementations, the alignment process may also include selection of a segment. For example, each of the input segments may be aligned with a reference segment and the input segment that provides the best alignment may be selected and used for further processing.

In some implementations, a Pearson's product-moment correlation may be used to perform the alignment. Let W represent a first segment and V represent a second segment. Each segment may comprise a sequence of feature vectors and each feature vector may comprise a vector of feature values. Where a segment comprises a sequence of N feature vectors and a feature vector comprises M feature values, the segment may comprise a total of N times M feature values. The feature values for segment W may be reformulated as a first vector and referred to as $w_i$ where i ranges from 1 to N times M. Similarly, the feature values for segment V may be reformulated as a second vector and referred to as $v_i$. The Pearson's product-moment correlation of segments W and V may be computed using the first vector and the second vector as $$r = \frac{\sum_{i=1}^{NM}(w_i - \overline{w})(v_i - \overline{v})}{(NM-1)\sigma_w \sigma_v}$$

where $\bar{w}$ is the sample mean of segment W, $\sigma_w$ is the sample standard deviation of segment W, $\bar{v}$ is the sample mean of segment V, and $\sigma_v$ is the sample standard deviation of segment V.

In computing the Pearson's product-moment correlation of two segments, the two segments need to have the same length (e.g., the same number of feature vectors). Any appropriate techniques may be used to modify the length of a segment so that it matches the length of another segment. For example, to increase the length of a segment, (i) feature vectors that occurred before or after the segment may be added to the beginning or end of the segment, (ii) the first or last feature vector of a segment may be repeated, or (iii) feature vectors of zeros may be added to the beginning or end of a segment. To decrease the length of a segment, feature vectors from the beginning or end of the segment may be discarded.

A few variations of the alignment procedure are now described. The alignment procedure is not limited to these examples and any suitable alignment procedure may be applied. In the following, $X_i$ represents the $i^{th}$ input segment of the input sequence of segments, and $Y_{j,k}$ represents the $j^{th}$ reference segment of the $k^{th}$ reference sequence of segments. The segments are obtained from a sequence of feature vectors, so in the following, $x_i$ represents the $i^{th}$ feature vector of the input sequence of feature vectors, and $y_{j,k}$ represents the $j^{th}$ reference feature vector of the $k^{th}$ reference sequence of feature vectors.

In some implementations, an alignment is performed using an input segment and a reference sequence of feature vectors. In these implementations, reference segments need not be used for the alignment process. Suppose that input segment $X_i$ has N feature vectors. Segment $X_i$ may initially be shifted to be adjacent to the beginning of the $k^{th}$ reference sequence of feature vectors. Accordingly, the first feature vector of $X_i$ may be adjacent to the first feature vector of the $k^{th}$ reference sequence of feature vectors ($y_{1,k}$) and the last feature vector of $X_i$ may be adjacent to the Nth feature vector of the $k^{th}$ reference sequence of feature vectors ($y_{N,k}$). The Pearson's product-moment correlation may then be computed for $X_i$ and the first N feature vectors of the $k^{th}$ reference sequence of feature vectors.

This process may be repeated for other shifts of $X_i$ and the $k^{th}$ reference sequence of feature vectors. For example, the process may be repeated by shifting $X_i$ so that it is adjacent to feature vectors 2 to N+1 of the $k^{th}$ reference sequence of feature vectors and then again computing the Pearson's product-moment correlation. This may be repeated until $X_i$ is adjacent to the last N feature vectors of the $k^{th}$ reference sequence of feature vectors and then again computing the Pearson's product-moment correlation. The alignment of $X_i$ with the $k^{th}$ reference sequence may be selected by choosing the shift that produces the highest value of the Pearson's product-moment correlation.

In some implementations, an alignment is performed using a reference segment and an input sequence of feature vectors (the reverse of the previous example). In these implementations, input segments need not be used for the alignment process. In a similar manner, a reference segment $Y_{j,k}$ may be shifted so that it is adjacent to different portions of the input sequence of feature vectors, and the Pearson's product-moment correlation may be computed for each shift. The alignment of $Y_{j,k}$ with the input sequence of feature vectors may be selected by choosing the shift that produces the highest value of the Pearson's product-moment correlation.

In some implementations, the alignment is performed by comparing input segment $X_i$ with each segment of a reference sequence of segments to determine both which segment of the reference sequence of segments is a best match to input segment $X_i$ and also the alignment of the best reference segment with input segment $X_i$. The best matching reference segment and the alignment may again be determined based on a highest value of the Pearson's product-moment correlation. For each reference segment, the Pearson's product-moment correlation may be computed for multiple time shifts of the reference segment with the input segment.

Returning to step 450, each of the selected reference segments are aligned with an input segment of the input sequence of segments. Depending on the implementation, the reference segments may be aligned with the input sequence of feature vectors instead of an input segment. Where the reference segments are aligned with an input segment, the alignment process may also select an input segment of the input sequence of segments that provides the best alignment. Where there are N reference sequences of segments, N alignments may be performed.

At step 460, a correlation is computed between each of the selected reference segments and the aligned input segment (or the aligned input sequence of feature vectors). In some implementations, the correlation may be computed as part of step 450. In some implementations, the alignments may not be determined using a correlation, and accordingly the correlations are computed in a subsequent step after the alignments have been performed. Each correlation may be the Pearson's product-moment correlation of a reference segment that is aligned with an input segment (or the input sequence of feature vectors). The correlation for the $j^{th}$ reference segment of the $k^{th}$ reference sequence of segments may be denoted as $r_{j,k}$. In some implementations, where there are N reference sequences, at each iteration of step 460, $r_{j,k}$ may be computed for k ranging from 1 to N and for a single value of j. The correlation computed at step 460 may include any computation that indicates a statistical dependence between two segments. For example, the correlation may be any of a Pearson's product-moment coefficient, a rank correlation coefficient, a Spearman's rank correlation coefficient, a Kendall's rank correlation coefficient, a distance correlation, a Brownian correlation, a randomized dependence coefficient, a correlation ratio, mutual information, a total correlation, a dual total correlation, a polychoric correlation, or a coefficient of determination.

At step 470, a segment score is computed from the correlations. The segment score may be any quantity that assists in the classification process, such as a likelihood. In some implementations, the segment score may be an average of the Fisher transformations of the correlations, computed as follows:

$$\phi_{j,k} = \frac{1}{2}\log\left(\frac{1+r_{j,k}}{1-r_{j,k}}\right)$$

$$\bar{\phi}_j = \frac{1}{N}\sum_{k=1}^{N}\phi_{j,k}$$

where N is the number of reference sequences of segments. This segment score may be modelled as a Gaussian random variable as described in greater detail below. In some implementations, each iteration of step 470 will produce a segment score $\bar{\phi}_j$ where j corresponds to the iteration.

At step 480, it is determined whether other segments remain to be processed. For example, steps 440 to 470 may be performed in a loop for each reference segment in the reference sequences of segments.

At step 485, a sequence score is computed using the segment scores. In some implementations, the sequence score may be computed using probability density functions (PDFs) that provide a likelihood for each of the segment scores. For example, let $f_j(\phi)$ denote a PDF for the segment score for the $j^{th}$ segment of the reference sequences of segments. The determination of the PDFs is described in greater detail below. In some implementations, the sequence score may be determined as follows:

$$S = \prod_{j=1}^{M} f_j(\bar{\phi}_j)$$

where M is the number of segments in each reference sequence of segments. In some implementations, the sequence score may be determined as follows:

$$S = \sum_{j=1}^{M} \ln(f_j(\bar{\phi}_j))$$

where ln is the natural log. The sequence score is not limited to the above examples, and any suitable sequence score may be used.

At step 490, it is determined whether the audio data corresponds to the asserted identity using the sequence score. Any suitable techniques may be used to make this determination. In some implementations, the sequence score may be compared to a threshold. In some implementations, Bayesian techniques may be applied and a prior probability corresponding to the asserted identity and/or risks of making certain types of errors (e.g., false acceptance or false rejection) may be used in making the determination. In some implementations, sequence scores may be computed for other users (users other than the user corresponding to the asserted identity) and the sequence scores of the other users may be used in making the determination (such as performing a cohort analysis).

Estimating Segment Probability Density Functions

In some implementations, the correlation classifier may use a probability density function (PDF) for a segment in computing the segment scores as described above. Now described is an example implementation of estimating a PDF for segment scores.

A PDF may be determined for each canonical segment of each user. Each user may provide numerous audio samples of speaking the prompt. For example, a user may provide 20 audio samples of speaking the prompt. The audio samples may be segmented using canonical segmentation so that a sequence of segments is created for each audio sample and each sequence of segments has the same number of segments. For example, each sequence may comprise 5 canonical segments as illustrated in FIG. 6. Accordingly, a PDF may be estimated for each canonical segment.

Figure 5:
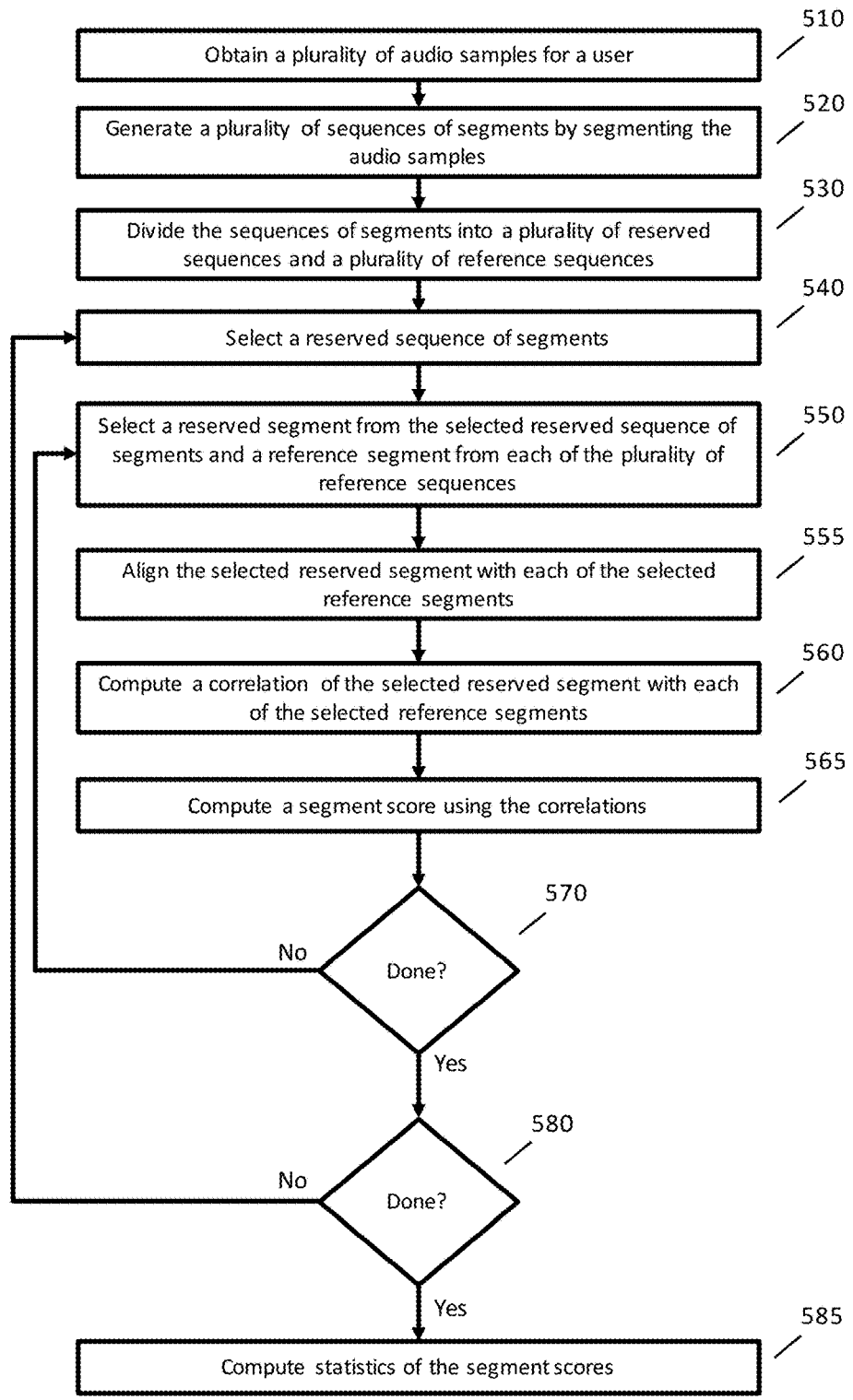
FIG. 5 is a flowchart of an example implementation of determining statistics of segments.

FIG. 5 is a flowchart illustrating an example implementation of determining PDFs for canonical segments of a speaker. In FIG. 5, the ordering of the steps is exemplary and other orders are possible, not all steps are required and, in some implementations, some steps may be omitted or other steps may be added. The processes of the flowcharts may be implemented, for example, by one or more computers, such as the computers described below or of the system 105 of FIG. 1B.

At step 510, a plurality of audio samples is obtained of a user speaking a prompt, such as obtaining 20 audio samples. In some implementations, the audio samples may be obtained as part of an enrollment process for a speaker recognition system. The audio samples may be in the form of audio data, such as an audio signal or a sequence of feature vectors computed from an audio signal.

At step 520, a sequence of segments is obtained for each audio sample using any of the segmentation techniques described above. In some implementations, canonical segmentation may be used as described above. Accordingly, a plurality of sequences of segments is obtained.

At step 530, the plurality of sequences of segments are split into two groups. One group may be referred to as the reserved group comprising a plurality of reserved sequences of segments, and the other group may be referred to as the reference group comprising a plurality of reference sequences of segments. A sequence of segments may be assigned to a group using any suitable technique, such as randomly assigning a sequence to a group. In some implementations, each of the two groups may have approximately the same number of sequences. For example, where there are 20 audio samples, there may be 10 reserved sequences of segments and 10 reference sequences of segments.

FIG. 6 illustrates an example of reference sequences and reserved sequences. As above, $Y_{j,k}$ represents the $j^{th}$ reference segment of the $k^{th}$ reference sequence of segments. The reference sequences used in FIG. 6 may be the same as or different from the reference sequences used in the process of FIG. 4. FIG. 6 also illustrates a plurality of reserved sequences of segments where $Z_{j,k}$ represents the $j^{th}$ reserved segment of the $k^{th}$ reserved sequence of segments.

At steps 540 to 580, reserved sequences of segments are processed. The sequences may be processed in a variety of orders, and the techniques described herein are not limited to any particular ordering and in some implementations the sequences may be processed in parallel. In some implementations, each reserved sequence of segments is processed iteratively over steps 540 to 580.

At step 550, a reserved sequence of segments is selected. For example, in a first iteration a first reserved sequence of segments may be selected.

At steps 550 to 570, the segments of the selected reserved sequence are processed. The segments may be processed in a variety of orders as described above for steps 440 to 480 of FIG. 4. In some implementations, steps 550 to 570 may process the segments of the selected reserved sequence in order from beginning to end.

At step 550, a reserved segment is selected from the selected reserved sequence of segments and a reference segment is selected from each of the reference sequences of segments. For example, for a $j^{th}$ iteration of the outer loop and a first iteration of the inner loop, reserved segment $Z_{1,j}$ may be selected and segments $Y_{1,i}$ may be selected for i from 1 to N where N is the number of reference sequences. For a $j^{th}$ iteration of the outer loop and a second iteration of the inner loop, reserved segment $Z_{2,j}$ may be selected and segments $Y_{2,i}$ may be selected for i from 1 to N, and so forth.

At step 555, the selected reserved segment is aligned with each of the selected reference segments using any of the alignment techniques described above. For example, for a $j^{th}$ iteration of the outer loop and a first iteration of the inner loop, reserved segment $Z_{1,j}$ may be aligned with each of segments $Y_{1,i}$ for i from 1 to N.

At step 560, a correlations are computed between the selected reserved segment and each of the selected reference segments. Any of the correlation techniques described above may be used. Where there are N reference sequences, N correlations may be computed. For example, for a $j^{th}$ iteration of the outer loop and a first iteration of the inner loop, a correlation is computed between segment $Z_{1,j}$ and each of segments $Y_{1,i}$ for i from 1 to N. The correlations may be denoted as $r_{1,j,i}$ for i from 1 to N.

At step 565, a segment score is computed using the correlations using any of the techniques described above. Where there are N reference sequences, the N correlations computed at step 560 may be combined to obtain a single segment score. For example, for a $j^{th}$ iteration of the outer loop and a first iteration of the inner loop, a segment score may be an average of the Fisher transformations of the correlations, computed as follows:

$$\phi_{i,j,i} = \frac{1}{2}\log\left(\frac{1+r_{1,j,i}}{1-r_{1,j,i}}\right)$$

$$\bar{\phi}_{1,j} = \frac{1}{N}\sum_{i=1}^{N}\phi_{1,j,i}$$

At step 570, it is determined whether other segments remain to be processed. For example, steps 550 to 570 may be performed in a loop for each reserved segment in the selected reserved sequence of segments. After all segments have been processed, a segment score may be computed for each segment of the selected reserved sequence of segments. Where there are 5 canonical segments, a segment score may be computed for the 5 segments of the selected reserved sequence.

At step 580, it is determined whether other reserved sequences of segments remain to be processed. For example, steps 540 to 580 may be performed in a loop for each reserved sequence of segments. After all reserved sequences have been processed, a segment score may have been computed for each segment of each reserved sequence. Where there are 10 reserved sequences and 5 canonical segments in each reserved sequence, there may be a total of 50 segment scores.

At step 585, statistics are computed from the segment scores. For example, where the sequences have been segmented using canonical segmentation, one or more statistics may be computed for each canonical segment from the multiple instances of the segment scores. For example, suppose there are 10 reserved sequences and each sequence comprises 5 canonical segments for a total of 50 segment scores. One or more statistics may be computed for the first canonical segment using the 10 segment scores computed from the first segment of each of the reserved sequences (denoted as $\bar{\phi}_{1,j}$ for j ranging from 1 to 10). Similarly, one or more statistics may be computed for the second canonical segment using the 10 segment scores computed from the second segment of each of the reserved sequences (denoted as $\bar{\phi}_{2,j}$ for j ranging from 1 to 10), and so forth.

Any appropriate statistics may be computed at step 585. In some implementations, it may be assumed that the segments scores may be modelled with a Gaussian distribution. Accordingly, a mean and variance of the segment scores may be computed to determine a PDF for the segment scores. In some implementations, statistics of a Student's t-distribution may be computed.

Implementation

Figure 7:
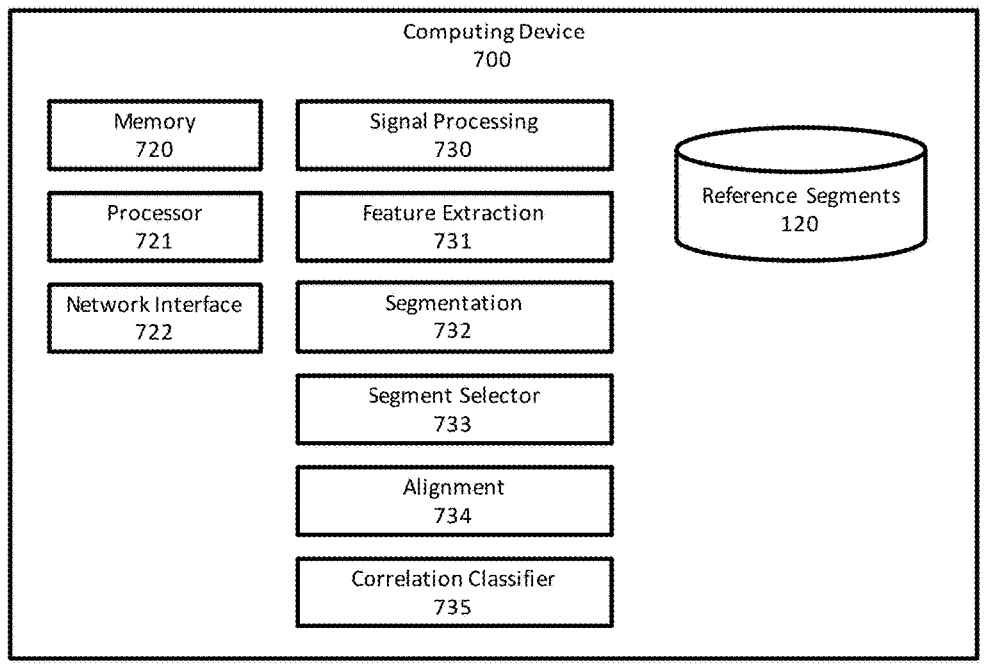
FIG. 7 is an exemplary computing device that may be used to classify signals using correlations of segments.

FIG. 7 illustrates components of one implementation of a computing device 700 for implementing any of the techniques described above. In FIG. 7, the components are shown as being on a single computing device 700, but the components may be distributed among multiple computing devices, such as a system of computing devices, including, for example, an end-user computing device (e.g., a smart phone or a tablet) and/or a server computing device (e.g., cloud computing). For example, the collection of audio data and pre-processing of the audio data may be performed by an end-user computing device and other operations may be performed by a server.

Computing device 700 may include any components typical of a computing device, such as volatile or nonvolatile memory 720, one or more processors 721, and one or more network interfaces 722. Computing device 700 may also include any input and output components, such as displays, keyboards, and touch screens. Computing device 700 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 700 may have a signal processing component 730 for performing any needed operations on an input signal, such as analog-to-digital conversion, encoding, decoding, subsampling, or windowing. Computing device 700 may have a feature extraction component 731 that computes feature vectors from audio data or an audio signal. Computing device 700 may have a segmentation component 732 that segments a sequence of feature vectors into a sequence of segments using any of the techniques described above. Computing device 700 may have a segment selector component 733 that receives an asserted identity and retrieves corresponding segments from a data store, such as reference segments data store 120. Computing device 700 may have an alignment component 734 that aligns two segments together and/or aligns a segment with a sequence of feature vectors. Computing device 700 may have a correlation classifier component 735 that performs other operations relating to the correlation classifier described above. In some implementations, the alignment component 734 and the correlation classifier component 735 may be merged into a single component. Computing device 700 may have or may have access to a data store of reference segments 120 to be used in performing classification.

Depending on the implementation, steps of any of the techniques described above may be performed in a different sequence, may be combined, may be split into multiple steps, or may not be performed at all. The steps may be performed by a general purpose computer, may be performed by a computer specialized for a particular application, may be performed by a single computer or processor, may be performed by multiple computers or processors, may be performed sequentially, or may be performed simultaneously.

The techniques described above may be implemented in hardware (e.g., field-programmable gate array (FPGA), application specific integrated circuit (ASIC)), in software, or a combination of hardware and software. The choice of implementing any portion of the above techniques in hardware or software may depend on the requirements of a particular implementation. A software module or program code may reside in volatile memory, non-volatile memory, RAM, flash memory, ROM, EPROM, or any other form of a non-transitory computer-readable storage medium.

Conditional language used herein, such as, "can," "could," "might," "may," "e.g.," is intended to convey that certain implementations include, while other implementations do not include, certain features, elements and/or steps. Thus, such conditional language indicates that that features, elements and/or steps are not required for some implementations. The terms "comprising," "including," "having," and the like are synonymous, used in an open-ended fashion, and do not exclude additional elements, features, acts, operations. The term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood to convey that an item, term, etc. may be either X, Y or Z, or a combination thereof. Thus, such conjunctive language is not intended to imply that certain embodiments require at least one of X, at least one of Y and at least one of Z to each be present.

While the above detailed description has shown, described and pointed out novel features as applied to various implementations, it can be understood that various omissions, substitutions and changes in the form and details of the devices or techniques illustrated may be made without departing from the spirit of the disclosure. The scope of inventions disclosed herein is indicated by the appended claims rather than by the foregoing description. All changes which come within the meaning and range of equivalency of the claims are to be embraced within their scope.

What is claimed is:

1. A computer-implemented method for classifying an input signal, the method comprising:
   obtaining an input sequence of feature vectors corresponding to the input signal;
   determining an input sequence of segments using the input sequence of feature vectors, wherein each input segment corresponds to a portion of the input sequence of feature vectors and the input sequence of segments comprises a first input segment and a second input segment;
   obtaining a plurality of reference sequences of segments corresponding to a first class, wherein:
      the plurality of reference sequences of segments comprises a first reference sequence of segments and the first reference sequence of segments comprises a first reference segment and a second reference segment, and
      the plurality of reference sequences of segments comprises a second reference sequence of segments and the second reference sequence of segments comprises a third reference segment and a fourth reference segment;
   aligning the first input segment with the first reference segment;
   aligning the first input segment with the third reference segment;
   computing a first correlation using the first input segment and the first reference segment;
   computing a second correlation using the first input segment and the third reference segment;
   computing a first segment score using the first correlation and the second correlation;
   aligning the second input segment with the second reference segment;
   aligning the second input segment with the fourth reference segment;
   computing a third correlation using the second input segment and the second reference segment;
   computing a fourth correlation using the second input segment and the fourth reference segment;
   computing a second segment score using the third correlation and the fourth correlation; and
   determining that the input signal corresponds to the first class using the first segment score and the second segment score.

2. The method of claim 1, wherein each feature vector of the input sequence of feature vectors comprises a plurality of harmonic amplitudes.

3. The method of claim 1, wherein the input signal comprises speech and the first class corresponds to speech of a first speaker.

4. The method of claim 1, wherein determining the input sequence of segments comprises:
   computing a mean of a spectrum of a portion of the input signal;
   computing a maximum value of the spectrum;
   computing a sum of squares of harmonic magnitudes of the portion of the input signal; and
   using a combination of the mean of the spectrum, the maximum value of the spectrum, and the sum of squares to determine a segment boundary.

5. The method of claim 1, wherein the input sequence of segments comprises a third input segment, the first sequence of reference segments comprises a fifth reference segment, the second sequence of reference segments comprises a sixth reference segment, and the method further comprising:
   aligning the third input segment with the fifth reference segment;
   aligning the third input segment with the sixth reference segment;
   computing a fifth correlation using the third input segment and the fifth reference segment;
   computing a sixth correlation using the third input segment and the sixth reference segment;
   computing a third segment score using the fifth correlation and the sixth correlation; and
   wherein determining that the input signal corresponds to the first class comprises using the third segment score.

6. The method of claim 1, wherein aligning the first input segment with the first reference segment comprises maximizing a correlation between the first input segment and the first reference segment.

7. The method of claim 1, wherein computing the first correlation using the first input segment and the first reference segment comprises:
   creating a first vector from feature vectors of the first input segment;
   creating a second vector from feature vectors of the first reference segment; and
   computing a Pearson's product-moment correlation of the first vector and the second vector.

8. The method of claim 1, wherein computing the first segment score using the first correlation and the second correlation comprises:
   computing a Fisher transform of the first correlation;
   computing a Fisher transform of the second correlation; and computing a mean of a plurality of values using the Fisher transform of the first correlation and the Fisher transform of the second correlation.

9. The method of claim 8, wherein determining that the input signal corresponds to the first class comprises computing a likelihood from the mean.

10. The method of claim 9, further comprising:
estimating mean and a standard deviation of a probability density function using a first reserved sequence of segments and a second reserved sequence of segments; and
computing the likelihood from the mean comprises using the estimated mean and the estimated standard deviation.

11. The method of claim 8, further comprising:
receiving an asserted identity; and
obtaining the plurality of sequences of reference segments using the asserted identity.

12. The method of claim 1, wherein the input signal comprises a plurality of audio samples obtained from a user speaking a prompt.

13. A system for classifying an input signal, the system comprising one or more computing devices comprising at least one processor and at least one memory, the one or more computing devices configured to:
obtain an input sequence of feature vectors corresponding to the input signal;
obtain a plurality of reference sequences of segments corresponding to a first class, wherein:
the plurality of reference sequences of segments comprises a first reference sequence of segments and the first reference sequence of segments comprises a first reference segment and a second reference segment, and
the plurality of reference sequences of segments comprises a second reference sequence of segments and the second reference sequence of segments comprises a third reference segment and a fourth reference segment;
compute a first correlation using the first reference segment and at least a portion of the input sequence of feature vectors;
compute a second correlation using the third reference segment and at least a portion of the input sequence of feature vectors;
compute a first segment score using the first correlation and the second correlation;
compute a third correlation using the second reference segment and at least a portion of the input sequence of feature vectors;
compute a fourth correlation using the fourth reference segment and at least a portion of the input sequence of feature vectors;
compute a second segment score using the third correlation and the fourth correlation; and
determine that the input signal corresponds to the first class using the first segment score and the second segment score.

14. The system of claim 13, wherein the one or more computing devices are configured to:
determine an input sequence of segments using the input sequence of feature vectors, wherein each input segment corresponds to a portion of the input sequence of feature vectors and the input sequence of segments comprises a first input segment and a second input segment; and
wherein computing the first correlation comprises using the first reference segment and the first input segment.

15. The system of claim 14, wherein the one or more computing devices are configured to align the first input segment with the first reference segment before computing the first correlation.

16. The system of claim 13, wherein the one or more computing devices are configured to align the first reference segment with at least a portion of the input sequence of feature vectors before computing the first correlation.

17. The system of claim 14, wherein computing the first correlation using the first input segment and the first reference segment comprises:
creating a first vector from the first input segment;
creating a second vector from the first reference segment; and
computing a Pearson's product-moment correlation of the first vector and the second vector.

18. The system of claim 13, wherein the one or more computing devices are configured to determine that the input signal corresponds to the first class by comparing a combination of the first segment score and the second segment score to a threshold.

19. One or more non-transitory computer-readable media comprising computer executable instructions that, when executed, cause at least one processor to perform actions comprising:
obtaining an input sequence of feature vectors corresponding to an input signal;
obtaining a plurality of reference sequences of segments corresponding to a first class, wherein:
the plurality of reference sequences of segments comprises a first reference sequence of segments and the first reference sequence of segments comprises a first reference segment and a second reference segment, and
the plurality of reference sequences of segments comprises a second reference sequence of segments and the second reference sequence of segments comprises a third reference segment and a fourth reference segment;
computing a first correlation using the first reference segment and at least a portion of the input sequence of feature vectors;
computing a second correlation using the third reference segment and at least a portion of the input sequence of feature vectors;
computing a first segment score using the first correlation and the second correlation;
computing a third correlation using the second reference segment and at least a portion of the input sequence of feature vectors;
computing a fourth correlation using the fourth reference segment and at least a portion of the input sequence of feature vectors;
computing a second segment score using the third correlation and the fourth correlation; and
determining that the input signal corresponds to the first class using the first segment score and the second segment score.

20. The one or more non-transitory computer-readable media of claim 19, wherein the computer executable instructions, when executed, cause the at least one processor to perform actions comprising:
determining an input sequence of segments using the input sequence of feature vectors, wherein each input segment corresponds to a portion of the input sequence of feature vectors and the input sequence of segments comprises a first input segment and a second input segment; and wherein computing the first correlation comprises using the first reference segment and the first input segment.

21. The one or more non-transitory computer-readable media of claim 19, wherein the computer executable instructions, when executed, cause the at least one processor to perform actions comprising:

computing a mean of a spectrum of a portion of a signal;

computing a maximum value of the spectrum;

computing a sum of squares of harmonic magnitudes of the portion of the signal; and using a second derivative of a combination of the mean of the spectrum, the maximum value of the spectrum, and the sum of squares to identify the first reference segment.

22. The one or more non-transitory computer-readable media of claim 19, wherein computing the first correlation comprises computing a Pearson's product-moment correlation.

23. The one or more non-transitory computer-readable media of claim 19, wherein the computer executable instructions, when executed, cause the at least one processor to perform actions comprising:

obtain a plurality of reference signals;

compute the plurality of reference sequences from the plurality of reference signals using canonical segmentation.

* * * * *